(12) United States Patent
Lee et al.

(10) Patent No.: US 12,549,206 B2
(45) Date of Patent: Feb. 10, 2026

(54) RF CHIP TO IMPROVE TRANSMIT CHANNEL FLATNESS

(71) Applicant: Samsung Electronics Co., Ltd., Suwon-si (KR)

(72) Inventors: Joonggeun Lee, Suwon-si (KR); Daechul Jeong, Suwon-si (KR); Jeongyeol Bae, Suwon-si (KR); Jongsoo Lee, Suwon-si (KR); Sangmin Yoo, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 205 days.

(21) Appl. No.: 18/356,308

(22) Filed: Jul. 21, 2023

(65) Prior Publication Data

US 2024/0120957 A1   Apr. 11, 2024

(30) Foreign Application Priority Data

Oct. 7, 2022  (KR) .......... 10-2022-0128659
Dec. 21, 2022 (KR) .......... 10-2022-0180454

(51) Int. Cl.
*H04B 1/04* (2006.01)
*H03F 3/195* (2006.01)
*H03F 3/24* (2006.01)

(52) U.S. Cl.
CPC ........... *H04B 1/0458* (2013.01); *H03F 3/195* (2013.01); *H03F 3/245* (2013.01); *H04B 2001/0416* (2013.01)

(58) Field of Classification Search
CPC .......... H04B 1/0458; H04B 2001/0416; H04B 2001/0408; H03F 3/195; H03F 3/245; H03F 3/45475; H03F 3/45183; H03F 2200/294; H03F 2200/451; H03F 3/193; H03F 1/56; H03F 3/211; H03F 3/45179; H03F 3/19; H03F 3/72; H03F 2200/387
See application file for complete search history.

(56) References Cited

U.S. PATENT DOCUMENTS

| | | | |
|---|---|---|---|
| 5,758,269 A | 5/1998 | Wu | |
| 7,151,411 B2 | 12/2006 | Martin et al. | |
| 8,463,225 B2* | 6/2013 | Igarashi | H04B 1/30 375/345 |
| 8,886,144 B2 | 11/2014 | Yin et al. | |
| 8,908,795 B2 | 12/2014 | Paek et al. | |
| 9,692,473 B2* | 6/2017 | Gard | H04B 1/18 |

(Continued)

OTHER PUBLICATIONS

Extended European Search Report dated Feb. 13, 2024 for corresponding European Application No. 23192031.5.

*Primary Examiner* — John W Poos
(74) *Attorney, Agent, or Firm* — Harness, Dickey & Pierce, P.L.C.

(57) ABSTRACT

A radio-frequency (RF) chip includes a mixer configured to mix a local oscillation signal with a baseband signal to output an RF signal, an amplification stage configured to amplify the RF signal through a plurality of unit amplifiers operating in response to a first control signal, and a compensation capacitor bank provided between the mixer and the amplification stage. The compensation capacitor bank is configured to adjust a capacitance of the compensation capacitor bank based on a second control signal, the second control signal being complementary to the first control signal.

20 Claims, 10 Drawing Sheets

(56) References Cited

U.S. PATENT DOCUMENTS

| | | | |
|---|---|---|---|
| 9,876,471 B2 | 1/2018 | Modi et al. | |
| 10,305,428 B1 | 5/2019 | Yang | |
| 11,190,142 B1* | 11/2021 | Tan | H03F 3/195 |
| 11,349,503 B2 | 5/2022 | Mohammadi et al. | |
| 2004/0157573 A1* | 8/2004 | Lee | H03F 3/45995 |
| | | | 455/240.1 |
| 2013/0109326 A1 | 5/2013 | Seckin et al. | |
| 2015/0280651 A1 | 10/2015 | Uzunkol et al. | |
| 2019/0074804 A1* | 3/2019 | Tripathi | H03F 3/45475 |
| 2022/0166511 A1 | 5/2022 | Kirrbach et al. | |
| 2022/0224364 A1 | 7/2022 | Kim et al. | |

* cited by examiner

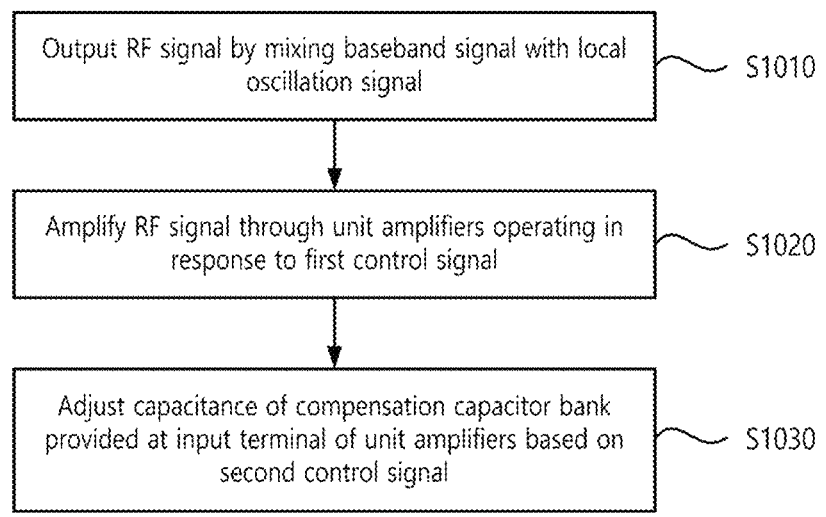

RF CHIP TO IMPROVE TRANSMIT CHANNEL FLATNESS

CROSS-REFERENCE TO RELATED APPLICATION(S)

This application claims benefit of priority to Korean Patent Application Nos. 10-2022-0128659, filed on Oct. 7, 2022, and 10-2022-0180454, filed on Dec. 21, 2022, in the Korean Intellectual Property Office, the disclosures of which are incorporated herein by reference in their entirety.

BACKGROUND

The present disclosure relate to radio-frequency (RF) chips.

A transmitter supports a function of adjusting a gain of a driver amplifier for a dynamic range. For example, the driver amplifier may include a plurality of unit amplifiers, and the gain of the driver amplifier may be adjusted based on an operation of slicing the plurality of unit amplifiers. In this case, the number of the sliced unit amplifiers may vary depending on the gain adjustment. Accordingly, the input impedance of the driver amplifier may vary. The variation of the input impedance of the driver amplifier may result in deterioration of channel flatness.

SUMMARY

Example embodiments provide RF chips having improved channel flatness.

According to some example embodiments, an RF chip includes a mixer configured to mix a local oscillation signal with a baseband signal to output an RF signal, an amplification stage configured to amplify the RF signal through a plurality of unit amplifiers operating in response to a first control signal, and a compensation capacitor bank provided between the mixer and the amplification stage. The compensation capacitor bank configured to adjust a capacitance of the compensation capacitor bank based on a second control signal, the second control signal being complementary to the first control signal.

According to some example embodiments, an operating method includes outputting an RF signal by mixing a baseband signal with a local oscillation signal, amplifying the RF signal through a plurality of unit amplifiers operating in response to a first control signal, and adjusting capacitance of a compensation capacitor bank, provided at an input terminal of the plurality of unit amplifiers, based on a second control signal, the second control signal being complementary to the first control signal.

According to some example embodiments, an electronic device includes a processor, an RF chip configured to receive a baseband signal from the processor and to output an RF signal from the baseband signal, a front-end module (FEM) configured to amplify the RF signal, and an antenna configured to transmit the RF signal. The RF chip may include a mixer configured to mix a local oscillation signal with a baseband signal to output an RF signal, an amplification stage configured to amplify the RF signal through a plurality of unit amplifiers operating in response to a first control signal, and a compensation capacitor bank provided between the mixer and the amplification stage. The compensation capacitor bank configured to adjust a capacitance of the compensation capacitor bank based on a second control signal, the second control signal being complementary to the first control signal.

BRIEF DESCRIPTION OF DRAWINGS

The above and other aspects, features, and advantages of the present disclosure will be more clearly understood from the following detailed description, taken in conjunction with the accompanying drawings.

FIG. 7 is a flowchart illustrating an operating method of an RF chip according to some example embodiments.

DETAILED DESCRIPTION

Hereinafter, example embodiments will be described with reference to the accompanying drawings.

Figure 1:
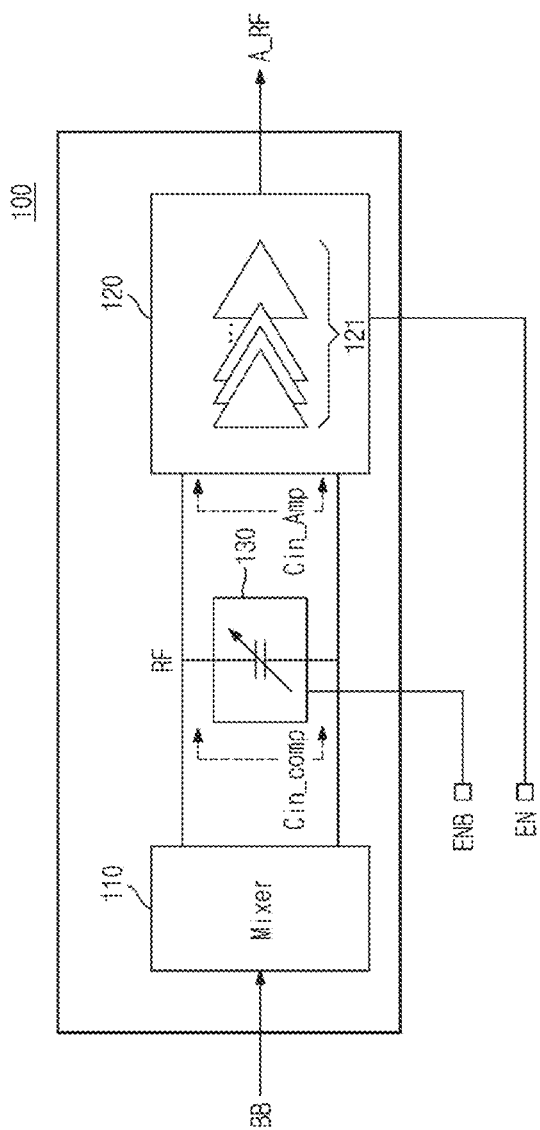
FIG. 1 is a diagram illustrating an RF chip according to some example embodiments.

FIG. 1 is a diagram illustrating an RF chip according to some example embodiments.

Referring to FIG. 1, a radio-frequency (RF) chip 100 according to some example embodiments may be defined as a chip or an integrated circuit (IC) including various components for converting a baseband signal BB or an intermediate-frequency (IF) signal into a radio-frequency signal RF, amplifying the radio-frequency signal RF, and transmitting the amplified signal. The RF chip 100 may be included as a portion of an RF chain or a transmit chain (TX chain). The RF chip 100 may include a mixer 110, an amplification stage 120, and a compensation capacitor bank 130.

The mixer 110 may receive a baseband signal BB, and may mix the baseband signal BB with a local oscillator (LO) signal to output a radio-frequency signal RF. The local oscillation signal may have a frequency for up-converting a frequency of the baseband signal BB to an RF band.

The amplification stage 120 may adjust a gain of the radio-frequency signal RF output from the mixer 110. The amplification stage 120 may include a plurality of unit amplifiers 121 for a dynamic range DR of the radio-frequency signal RF. In some example embodiments, the plurality of unit amplifiers 121 may be connected to each other in parallel and may operate in response to a first control signal EN. The first control signal EN may be an enable signal for slicing, for example, turning on or turning off, each of the plurality of unit amplifiers 121. The first control signal EN may be a digital signal for controlling each of the plurality of unit amplifiers 121.

In some example embodiments, when the number of unit amplifiers 121 is n (where n is a positive integer), the first control signal EN may having a magnitude of n bits. Each of the plurality of unit amplifiers 121 may be turned on or off based on a logic state of each bit of the first control signal EN. The amplification stage 120 may control the number of unit amplifiers 121, turned on based on the first control signal EN, to adjust a gain of the radio-frequency signal RF.

The amplification stage 120 may amplify the radio-frequency signal RF through the plurality of unit amplifiers 121 operating in response to the first control signal EN, and may output the amplified RF signal A_RF.

In some example embodiments, when the plurality of unit amplifiers 121 are implemented based on a transistor, a gate bias of the transistor may be adjusted to a ground voltage VSS in a unit amplifier 121 turned off by the first control signal EN. As the gate bias is adjusted to the ground voltage VSS, input capacitance of the turned-off unit amplifier 121 may be relatively decreased as compared with input capacitance of a turned-on unit amplifier 121. For example, input capacitance Cin_Amp (or impedance) of the amplification stage 120 may vary depending on the number of unit amplifiers 121 turned on or off based on adjustment of the dynamic range DR.

For example, as the number of the turned-off unit amplifiers 121 is relatively increased, the input capacitance Cin_Amp of the amplification stage 120 may be decreased. When the input capacitance Cin_Amp varies, a tuning frequency of the radio-frequency signal RF may be up-shifted to a relatively high frequency. Such a shift of the tuning frequency may cause channel flatness to deteriorate.

In some example embodiments, the RF chip 100 may additionally include a compensation capacitor bank 130 between the mixer 110 and the amplification stage 120 to compensate for the variation of the input capacitance Cin_Amp depending on the above-described gain adjustment of the amplification stage 120. The compensation capacitor bank 130 may be provided between the mixer 110 and the amplification stage 120. One end of the compensation capacitor bank 130 may be connected to an output terminal of the mixer 110, and the other end thereof may be connected to an input terminal of the amplification stage 120. In some example embodiments, the mixer 110 and the amplification stage 120 may communicate (e.g., be electrically connected through/via) the compensation capacitor bank 130.

The compensation capacitor bank 130 may have capacitance adjusted based on a second control signal ENB, complementary to the first control signal EN. The term "complementary" may mean that the second control signal ENB is configured to control an operation, opposite to an operation based on the first control signal EN. For example, a logical level of each bit included in the second control signal ENB may be opposite to a logical level of each bit included in the first control signal EN. The second control signal ENB only operates to be complementary to the first control signal EN, so that the second control signal ENB, similarly to the first control signal EN, may have a magnitude of n bits when the number of the unit amplifiers 121 is n.

In some example embodiments, when a relatively large number of unit amplifiers 121 are turned off based on the first control signal EN, the input capacitance Cin_Amp of the amplification stage 120 may be relatively decreased. Accordingly, the second control signal ENB, complementary to the first control signal EN, may control the compensation capacitor bank 130 to increase input capacitance Cin_comp of the compensation capacitor bank 130. For example, the capacitance of the compensation capacitor bank 130 may have a larger value as the number of turned-off unit amplifiers 121, among the plurality of unit amplifiers 121, is increased.

As an example, when a relatively large number of unit amplifiers 121 are turned on based on the first control signal EN, the input capacitance Cin_Amp of the amplification stage 120 may be relatively increased. Accordingly, the second control signal ENB, complementary to the first control signal EN, may control the compensation capacitor bank 130 to decrease the input capacitance Cin_comp of the compensation capacitor bank 130.

According to some example embodiments, the capacitance of the compensation capacitor bank 130 may compensate for the input impedance of the amplification stage 120 varying depending on the first control signal EN. Accordingly, the input capacitance or the input capacitance Cin_comp of the compensation capacitor bank 130, viewed from an output terminal of the mixer 110, may be maintained to be constant in spite of the capacitance variation depending on the gain adjustment of the amplification stage 120.

According to some example embodiments, when the input capacitance Cin_Amp of the amplification stage 120 varies depending on the gain adjustment of the amplification stage 120, the variation may be compensated for through the compensation capacitor bank 130, provided between the mixer 110 and the amplification stage 120, to maintain a tuning frequency and to prevent or reduce channel flatness from deteriorating. For example, the compensation capacitor bank 130 may be controlled through the second control signal ENB, complementary to the first control signal EN of the amplification stage 120 for gain adjustment, to control the capacitance of the compensation capacitor bank 130 in a direction in which the variation of the input capacitance Cin_Amp of the amplification terminal 120 is compensated for.

Hereinafter, some example embodiments related to the above-described RF chip will be described in detail.

Figure 2:
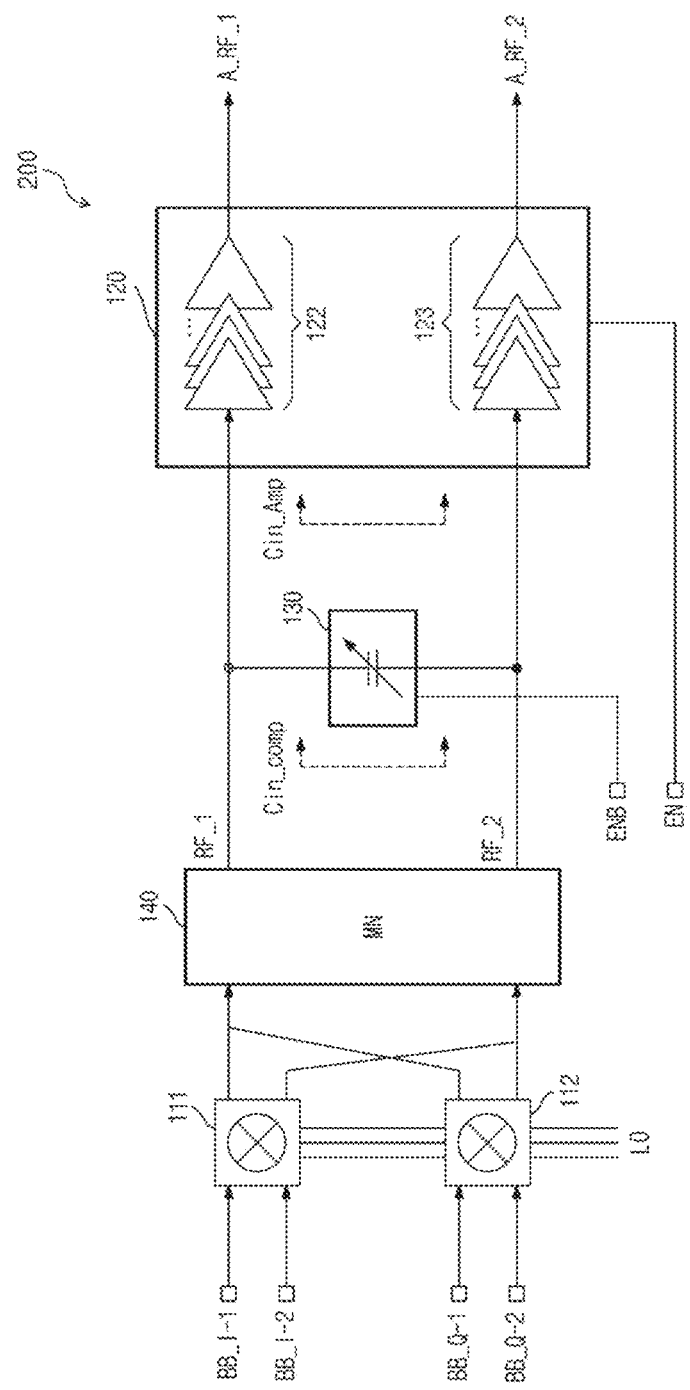
FIG. 2 is a diagram illustrating an RF chip according to some example embodiments.

FIG. 2 is a diagram illustrating an RF chip according to some example embodiments.

Referring to FIG. 2, an RF chip 200 according to some example embodiments may include mixers 111 and 112, an amplification stage 120, a compensation capacitor bank 130, and a matching network 140.

The mixers 111 and 112 may receive and mix I_baseband signals BB_I-1 and BB_I-2 and the Q_baseband signals BB_Q-1 and BB_Q-2 with a local oscillation signal LO to output RF Signals RF_1 and RF_2. Each of the I_baseband signals BB_I-1 and BB_I-2 may be a differential signal, and each of the Q_baseband signals BB_Q-1 and BB_Q-2 may also be a differential signal. The first I_baseband signal BB_I-1 and the second I_baseband signal BB_I-2 may have opposite phases, and the first Q_baseband signal BB_Q-1 and the second I_baseband signal BB_Q-2 may have opposite phases. The I_baseband signals BB_I-1 and BB_I-2 and the Q_baseband signals BB_Q-1 and BB_Q-2, converted into RF frequencies through the mixers 111 and 112, may be integrated through the matching network 140.

The matching network 140 may receive output signals of the mixers 111 and 112, and may output RF signals RF_1 and RF_2. The RF signals RF_1 and RF_2 may be differential signals including a first radio-frequency signal RF_1 and a second radio-frequency signal RF_2 having opposite phases. In some example embodiments, the matching network 140 may be implemented as a transformer-based network, a shunt inductor-based network, an L network-based network, an LC tank-based network, or the like. Alternatively, the matching network 140 may be omitted as illustrated in FIG. 1.

The amplification stage 120 may include a plurality of first unit amplifiers 122 and a plurality of second unit amplifiers 123, respectively processing differential signals. The plurality of first unit amplifiers 122 may be configured to adjust a gain of the first radio-frequency signal RF_1, and the plurality of second unit amplifiers 123 may be configured to adjust a gain of the second radio-frequency signal RF_2. A first amplified RF signal A_RF_1, having the gain adjusted through the plurality of first unit amplifiers 122, may be output, and a second amplified RF signal A_RF_2, having the gain adjusted through the plurality of second unit amplifiers 123, may be output.

Each of the plurality of first unit amplifiers 122 and each of the plurality of second unit amplifiers 123 may be turned on or turned off based on the first control signal EN.

The compensation capacitor bank 130 may be provided between the matching network 140 and the amplification stage 120. The compensation capacitor bank 130 may operate in response to a second control signal ENB, complementary to the first control signal EN controlling the amplification stage 120 (e.g., as illustrated in FIG. 1). The capacitance of the compensation capacitor bank 130 may be adjusted based on the second control signal ENB, allowing the input capacitance Cin_Comp of the compensation capacitor bank 130 to be adjusted.

In some example embodiments, the radio-frequency signal RF output from the amplification stage 120 may be tuned to a specific tuning frequency. The tuning frequency may be determined based on the input capacitance Cin_Amp of the amplification stage 120, the capacitance of the compensation capacitor bank 130, and impedance of the matching network 140. For example, the tuning frequency may be determined based on input impedance of an output terminal of the mixers 111 and 112 or an input terminal of the matching network 140. In this case, as described above, the input capacitance Cin_Amp of the amplification stage 120 may vary depending on gain adjustment, and thus the tuning frequency may also vary.

For example, when the RF chip 200 operates with a low gain, the number of turned-off unit amplifiers 121, among the plurality of first unit amplifiers 122 and the plurality of second unit amplifiers 123, may be relatively increased. This implies a decrease in the input capacitance Cin_Amp of the amplification stage 120. The compensation capacitor bank 130 may operate in response to the second control signal ENB, complementary to the first control signal EN operating the amplification stage 120, to compensate for the decreased input capacitance of the amplification stage 120. Accordingly, even when the input capacitance Cin_Amp of the amplification stage 120 varies, the capacitance of the compensation capacitor bank 130 may compensate for the variation of the input capacitance Cin_Amp of the amplification stage 120, so that input impedance of the input terminal of the matching network 140 may be maintained to be constant.

Figure 3:
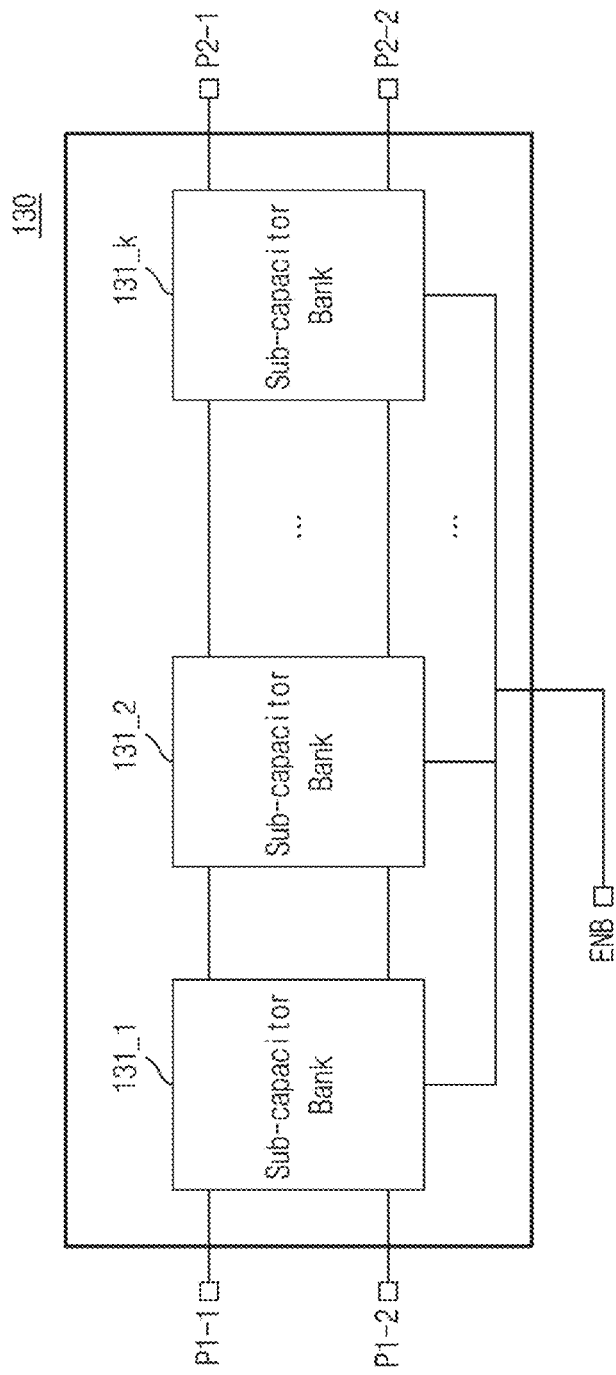
FIG. 3 is a diagram illustrating a compensation capacitor bank according to some example embodiments.

FIG. 3 is a diagram illustrating a compensation capacitor bank according to some example embodiments.

Referring to FIG. 3, the compensation capacitor bank 130 may be connected to first differential ports P1-1 and P1-2, connected to the above-described mixer 110 or matching network 140, and second differential ports P2-1 and P2-2 connected to the amplification stage 120. The compensation capacitor bank 130 may include one or more sub-capacitor banks 131_1, 131_2 to 131_k.

The one or more sub-capacitor banks 131_1, 131_2 to 131_k may operate in response to a second control signal ENB applied in common. Capacitance of each of the one or more sub-capacitor banks 131_1, 131_2 to 131_k may be adjusted based on the second control signal ENB.

Even when the second control signal ENB is applied in common, the capacitances of the sub-capacitor banks 131_1, 131_2 to 131_k may be different from each other. For example, based on the second control signal ENB, the capacitance of the first sub-capacitor bank 131_1 may be adjusted by Ca, the capacitance of the second sub-capacitor bank 131_2 may be adjusted by Cb, and the capacitance of the third sub-capacitor bank 131_k may be adjusted by Cc, where Ca, Cb, and Cc may be different real values.

In some example embodiments, each of the sub-capacitor banks 131_1, 131_2 to 131_k may be implemented to have a value varying depending on a gain step of the amplification stage 120 in which capacitance is adjusted based on the first control signal EN. In addition, the sub-capacitor banks 131_1, 131_2 to 131_k may include k sub-capacitor banks (where k is a positive integer), and k may also be set to vary depending on the gain step of the amplification stage 120.

Figure 4:
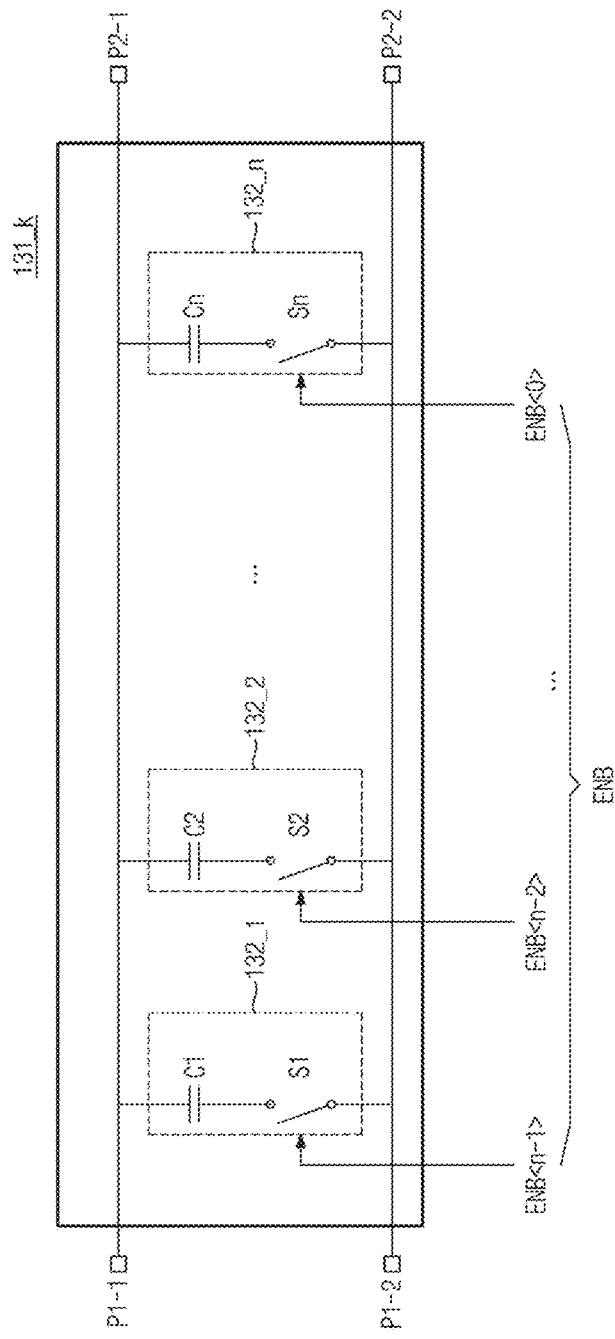
FIG. 4 is a diagram illustrating a sub-capacitor bank of FIG. 3.

FIG. 4 is a diagram illustrating the sub-capacitor bank of FIG. 3.

Referring to FIG. 4, each of the single sub-capacitor banks (e.g., sub-capacitor bank 131_k as illustrated in FIG. 4) may include a plurality of capacitor adjustment circuits 132_1, 132_2 to 132_n.

The capacitor adjustment circuits 132_1, 132_2 to 132_n may include switches S1, S2 to Sn and unit capacitors C1, C2 to Cn connected to the switches S1, S2 to Sn, respectively. For ease of description, in FIG. 4, each capacitor adjustment circuit is illustrated as including a single unit capacitor. However, in some example embodiments, one or more unit capacitors may be connected to a single switch. The number of capacitor adjustment circuits 132_1, 132_2 to 132_n may be n, which is the same as the number of unit amplifiers 121.

The second control signal ENB may be applied to the respective capacitor adjustment circuits 132_1, 132_2 to 132_n to independently operate the capacitor adjustment circuits 132_1, 132_2 to 132_n. For example, when the second control signal ENB is an n-bit signal, the second control signal ENB may be applied to the respective capacitor adjustment circuits 132_1, 132_2 to 132_n in units of bits.

The same number of capacitor adjustment circuits 132_1, 132_2 to 132_n as the plurality of unit amplifiers 121 may be provided for each of the sub-capacitor banks 131_1, 131_2 to 131_k such that the plurality of capacitor adjustment circuits 132_1, 132_2 to 132_n operates independently. For example, when the number of unit amplifiers 121 is n, n capacitor adjustment circuits 132_1, 132_2 to 132_n may also be provided for each of the sub-capacitor bank 131_1, 131_2 to 131_k.

The switches S1, S2 to Sn, respectively included in the capacitor adjustment circuits 132_1, 132_2 to 132_n, may be turned on or turned off based on the second control signal ENB applied in units of bits. For example, when the first control signal EN applied to the amplification stage 120 in units of bits is EN<n−1>, EN<n−2>, and EN<0>, the second control signal ENB applied to the plurality of capacitor adjustment circuits 132_1, 132_2, and 132_n in units of bits may be ENB<n−1>, ENB<n−2>, and ENB<0>. Each of ENB<n−1>, ENB<n−2>, and ENB<0> may have a logical level, different from a logical level of each of EN<n−1>, EN<n−2>, and EN<0>.

For example, when EN<n−1>, EN<n−2>, and EN<0> have logical levels of 1, 1, and 1, respectively, ENB<n−1>, ENB<n−2>, and ENB<0> may have logical levels of 0, 0, and 0, respectively. In this case, all of the switches S1, S2, and Sn may be turned off. For example, when EN<n−1>, EN<n−2>, and EN<0> have logical levels of 1, 1, and 0, respectively, ENB<n−1>, ENB<n−2>, and ENB<0> may have logical levels of 0, 0, and 1, respectively. In this case, among the plurality of capacitor adjustment circuits 132_1, 132_2, and 132_n, only the capacitor adjustment circuit 132_n applied with ENB<0> may operate and the other capacitor adjustment circuits may be turned off. In the above example embodiments, n has been 3 for clarity of explanation, however, example embodiments are not limited thereto and n may be another real number.

According to some example embodiments, in the case of the capacitor adjustment circuits 132_1, 132_2 to 132_n which do not operate as the switches S1, S2 to Sn are turned off, one or more unit capacitors C1, C2 to Cn connected to the switches S1, S2 to Sn may not affect any more total capacitance of the sub-capacitor banks 131_1, 131_2 to 131_k.

When m unit amplifiers, among n unit amplifiers 121 (where m is a positive integer less than or equal to n), are turned on based on the first control signal EN, n-m capacitor adjustment circuits 132_1, 132_2 to 132_n may be turned on based on the switches S1, S2 to Sn operating in response to the second control signal ENB. In some example embodiments, an n number of unit amplifiers 121 and capacitor adjustment circuits 132_1 to 132_n may be in the on state, with the ratio of unit amplifiers 121 being on to the capacitor adjustment circuits 132_1 to 132_n being on varying with the first and second control signals EN, ENB.

When one or more switches S1, S2 to Sn are turned on, capacitance obtained by summing equivalent capacitances of one or more unit capacitors C1, C2 to Cn connected to the turned-on switches S1, S2 to Sn may be total capacitance of the compensator capacitor bank 130. Accordingly, as the number of unit amplifiers 121 turned off based on the first control signal EN is increased, the number of capacitor adjustment circuits 132_1, 132_2 to 132_n turned on based on the second control signal ENB may be increased, and thus the total capacitance of the compensation capacitor bank 130 may also be increased. As a result, even when the input capacitance Cin_Amp of the amplification stage 120 is decreased as the number of turned-off unit amplifiers 121 is increased, the decreased capacitance may be compensated for through the compensation capacitor bank 130.

Figure 5:
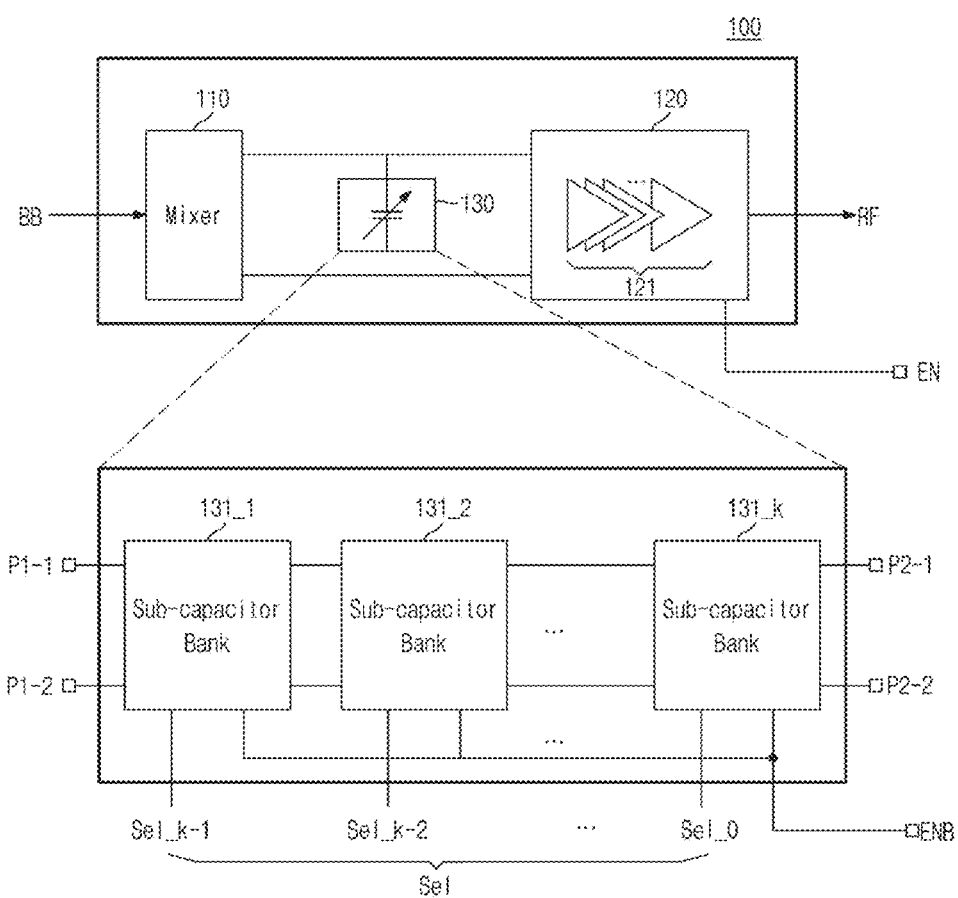
FIG. 5 is a diagram illustrating an RF chip, capable of selecting a sub-capacitor bank according to some example embodiments.

FIG. 5 is a diagram illustrating an RF chip, capable of selecting a sub-capacitor bank according to some example embodiments.

Referring to FIG. 5, in the RF chip 100, the compensation capacitor bank 130 may be additionally applied with a select signal (hereinafter referred to as a "third control signal Sel") for independently operating one or more sub-capacitor banks 131_1, 131_2 to 131_k. The third control signal Sel may be applied to the compensation capacitor bank 130.

The third control signal Sel may be individually applied to the plurality of sub-capacitor banks 131_1, 131_2 to 131_k to select each of the plurality of sub-capacitor banks 131_1, 131_2 to 131_k. When the number of the sub-capacitor banks 131_1, 131_2 to 131_k is k, k third control signals Sel may be applied. In addition, adjusted capacitances of the sub-capacitor banks 131_1, 131_2 to 131_k may be different from each other.

Among the plurality of sub-capacitor banks 131_1, 131_2 to 131_k, one or more sub-capacitor banks 131_1, 131_2 to 131_k may each be turned on or turned off based on the third control signal Sel. The fact that each of the sub-capacitor banks 131_1, 131_2 to 131_k is turned off may mean that capacitances of the turned-off sub-capacitor banks 131_1, 131_2 to 131_k do not affect total capacitance of the compensation capacitor bank 130, similarly to the above-described unit capacitors C1, C2 to Cn.

By turning on or turning off a plurality of sub-capacitor banks 131_1, 131_2 to 131_k based on the third control signal Sel, the RF chip 100 may more finely (e.g., narrowly, targeted) compensator for capacitance. For example, capacitances of the first sub-capacitor banks 131_1, 131_2 to 131_k, applied with a k−1-th third control signal Sel_k−1, may be implemented to be higher than capacitances of the second sub-capacitor banks 131_1, 131_2 to 131_k applied with a k−2-th third control signal Sel_k−2. In this case, when the input capacitance Cin_Amp of the amplification stage 120 varying depending on the first control signal EN is high, the first sub-capacitor banks 131_1, 131_2 to 131_k may be selected to more coarsely (e.g., broadly) compensate for capacitance. Alternatively, when the varying input capacitance Cin_Amp of the amplification stage 120 is low, the second sub-capacitor banks 131_1, 131_2 to 131_k may be selected to more finely (e.g., narrowly, targeted) compensate for capacitance.

Alternatively, two or more sub-capacitor banks 131_1, 131_2 to 131_k may be selected and combined based on the varying input capacitance Cin_Amp of the amplification stage 120.

According to example embodiments, as the number k of the plurality of sub-capacitor banks 131_1, 131_2 to 131_k is further increased, capacitance may be more finely compensated for. For example, the capacitance may be more granularly tuned.

Figure 6:
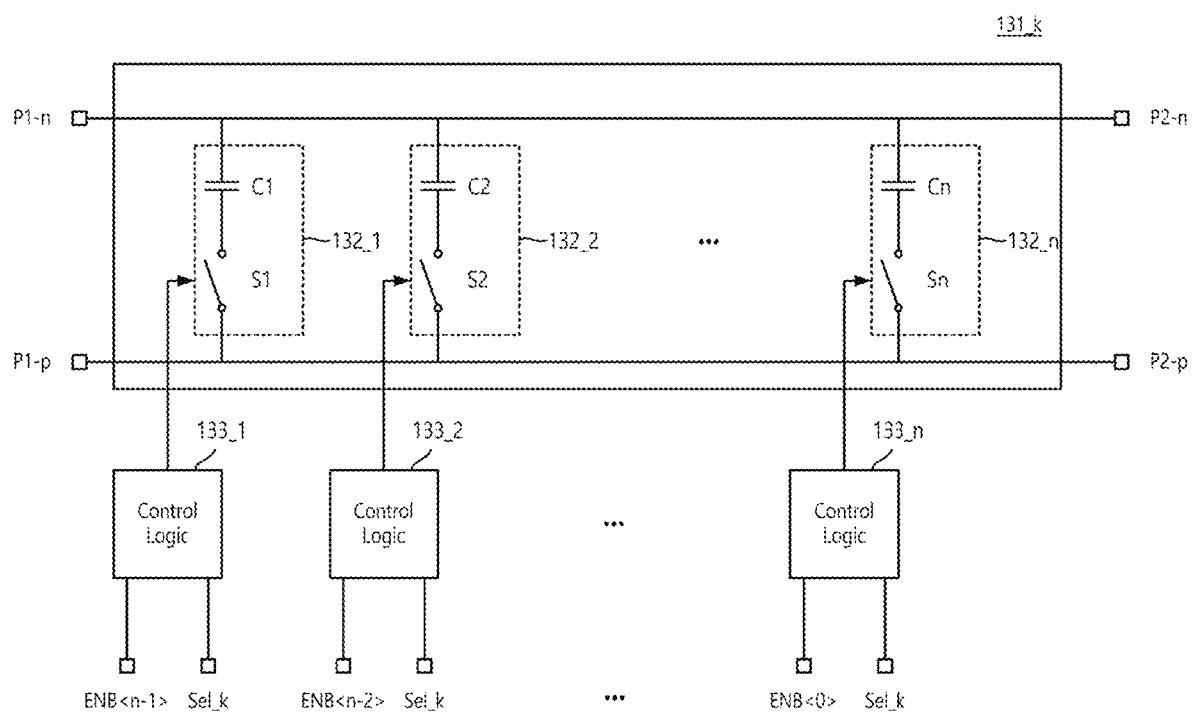
FIG. 6 is a diagram provided to describe an operation of the sub-capacitor bank of FIG. 5.

FIG. 6 is a diagram provided to describe an operation of the sub-capacitor bank of FIG. 5.

Referring to FIG. 6, control circuits 133_1, 133_2 to 133_n, controlling the compensation capacitor bank 130 based on a second control signal ENB and a third control signal Sel_k (described with respect to a k-th control signal for ease of description), may be connected to a plurality of capacitor adjustment circuit 132_1, 132_2 to 132_n included in the sub-capacitor banks 131_1, 131_2 to 131_k according to some example embodiments. The control circuits 133_1, 133_2 to 133_n may be provided in plural to be respectively connected to the switches S1, S2 to Sn.

The control circuits 133_1, 133_2 to 133_n may be connected to the plurality of switches S1, S2 to Sn included in the plurality of capacitor adjustment circuits 132_1, 132_2 to 132_n, respectively. The control circuits 133_1, 133_2 to 133_n may have the second control signal ENB and the third control signal Sel_k as inputs. In some example embodiments, the second control signal ENB may be applied to the control circuits 133_1, 133_2 to 133_n for each unit of bits (e.g., as ENB<n−1> applied to the control circuit 133_1, etc.), and the third control signal Sel_k may be applied to the control circuits 133_1, 133_2 to 133_n in units of a single sub-capacitor bank 131_1, 131_2, or 131_k. For example, a common third control signal Sel_k may be applied to the control circuits 133_1, 133_2 to 133_n connected to the single sub-capacitor bank 131_1, 131_2, or 131_k.

The control circuits 133_1, 133_2 to 133_n may turn on or turn off the switches S1, S2 to Sn based on logical states of the second control signal ENB and the third control signal Sel_k, respectively. For example, when the third control signal Sel_k instructs the sub-capacitor banks 131_1, 131_2 to 131_k to be turned on, the control circuits 133_1, 133_2 to 133_n may turn on or turn off each of the switches S1, S2 to Sn based on a logical state of each bit of the second control signal ENB. For example, when the third control signal Sel_k instructs the sub-capacitor banks 131_1, 131_2 to 131_k to be turned off, the control circuits 133_1, 133_2 to 133_n may turn off all of the switches S1, S2 to Sn. In this case, a single sub-capacitor bank 131_1, 131_2, or 131_k, to which the control circuits 133_1, 133_2 to 133_n are connected, may not affect total capacitance of the compensation capacitor bank 130. As a result, the control circuits 133_1, 133_2 to 133_n may operate one or more sub-capacitor banks 131_1, 131_2 to 131_k, among the plurality of sub-capacitor banks 131_1, 131_2 to 131_k, based on the third control signal Sel_k and a plurality of capacitor adjustment circuits 132_1, 132_2 to 132_n, respectively included in the operating one or more sub-capacitor banks 131_1, 131_2 to 131_k, may be turned on or turned off based on the second control signal ENB.

According to the some example embodiments, the compensation capacitor bank 130 may be controlled through the control circuits 133_1, 133_2 to 133_n. For example, in consideration of the input capacitance Cin_Amp of the amplification stage 120 varying depending on the first control signal EN, some sub-capacitor banks 131_1, 131_2 to 131_k, among the plurality of sub-capacitor banks 131_1, 131_2 to 131_k having different capacitances, may operate or any sub-capacitor banks 131_1, 131_2, 131_k may operate. As a result, based on a degree to which input capacitance varies, capacitance may be more finely (e.g., across a smaller range) or coarsely (e.g., broadly, across a wider range) compensated for and channel flatness may be improved.

FIG. 7 is a flowchart illustrating an operating method of an RF chip according to some example embodiments.

Referring to FIG. 7, in operation S1010, the RF chip 100 (or, for example RF chip 200) may output a radio-frequency signal RF by mixing a local oscillation signal with a baseband signal BB.

In operation S1020, the RF chip 100 or 200 may amplify the radio-frequency signal RF through the plurality of unit amplifiers 121 operating in response to the first control signal EN. In this case, at least one of the plurality of unit amplifiers 121 may be turned on or turned off based on the first control signal EN, and thus a gain of the radio-frequency signal RF may be adjusted.

In operation S1030, the RF chip 100 or 200 may adjust the capacitance of the compensation capacitor bank 130, provided at an input terminal of a plurality of unit amplifiers 121, based on the second control signal ENB complementary to the first control signal EN. In this case, when the number of unit amplifiers 121 is n, the first control signal EN and the second control signal ENB may have a magnitude of n bits.

Operation S1030 may be performed to be complementary to operation S1020. For example, the gain of the radio-frequency signal RF may be adjusted based on application of the first control signal EN, and the input capacitance Cin_Amp of the amplification stage 120, varying depending on adjustment of the gain of the radio-frequency signal RF based on the application of the second control signal ENB, may be compensated for.

In some example embodiments, the operating method may further include applying the third control signal Sel to individually operate one or more compensation capacitor banks 130 included in the compensation capacitor bank 130. The applying the third control signal Sel may be performed together with operation S1030. The control circuits 133_1, 133_2 to 133_n applied with the third control signal Sel may turn on or turn off the compensation capacitor bank 130 and the capacitor adjustment circuits 132_1, 132_2 to 132_n, included in the compensation capacitor bank 130, in consideration of a logical state of the second control signal ENB and a logical state of the third control signal Sel.

Figure 8A:
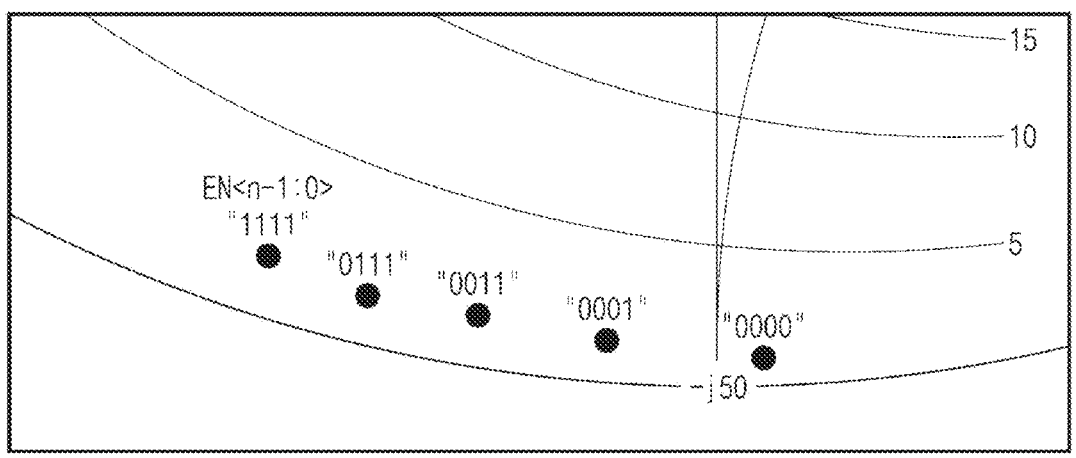
FIGS. 8A and 8B are diagrams illustrating amplifier input capacitance based on whether a compensation capacitor bank is present or absent.
Figure 8B:
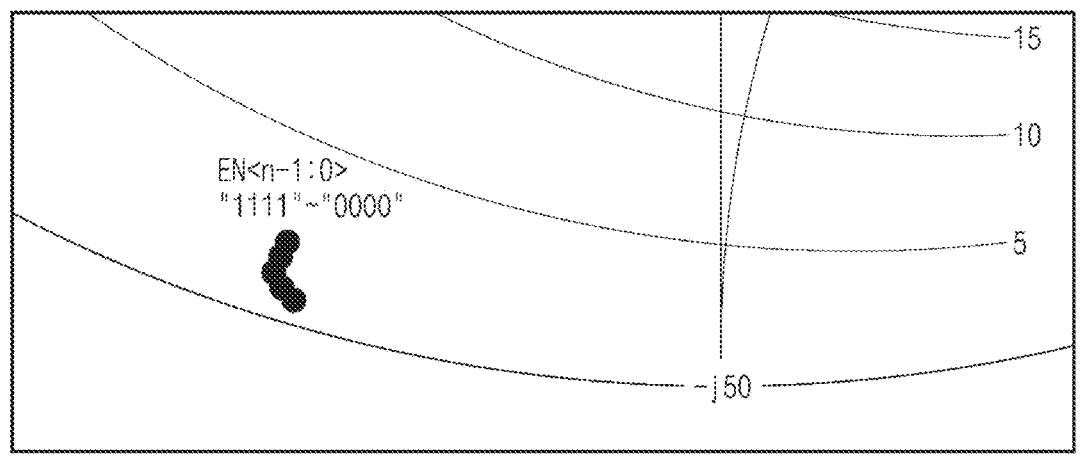

FIGS. 8A and 8B are diagrams illustrating amplifier input capacitance based on whether a compensation capacitor bank is present or absent. For ease of description, in FIGS. 8A and 8B, the first control signal is illustrated as being a 4-bit signal, but example embodiments are not limited thereto.

As can be seen from FIG. 8A, in the absence of the compensation capacitor bank 130, input capacitance is decreased on a Smith chart as the number of logic '0' bits, among bits of the first control signal EN, is increased, for example, the number of turned-off unit amplifiers 121 is increased.

Meanwhile, as can be seen from FIG. 8B, in the presence of the compensation capacitor bank 130, input capacitance hardly varies and is maintained within a predetermined (or, alternatively, desired, selected, or determined) range even when a state of the unit amplifier 121 varies depending on the first control signal EN, which means that varying input capacitance Cin_Amp of the amplification stage 120 is compensated for through the compensation capacitor bank 130.

Figure 9A:
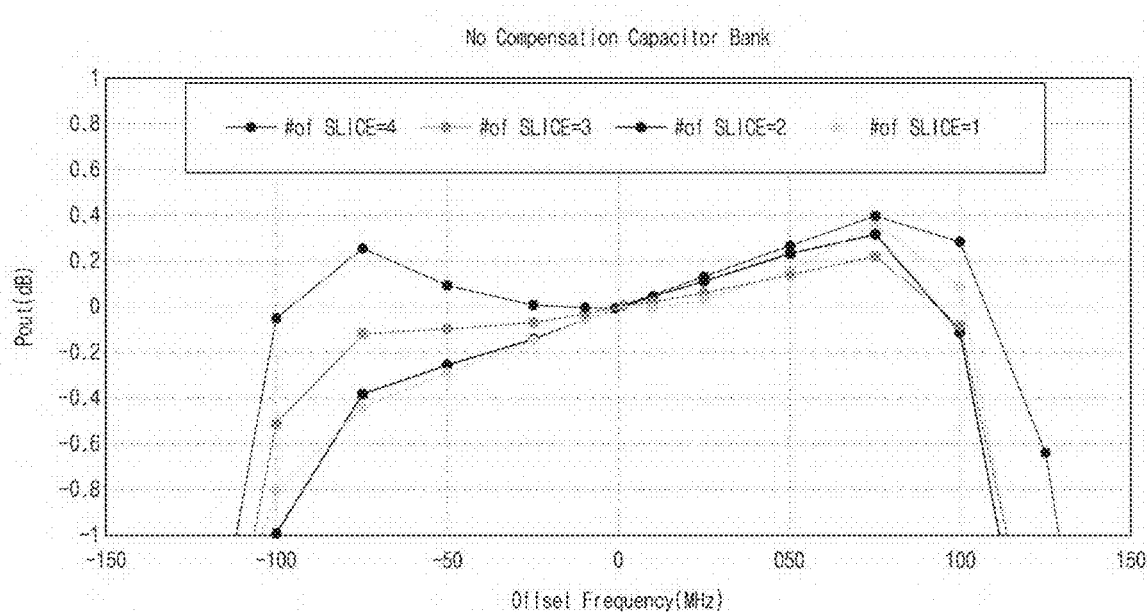
FIGS. 9A and 9B are diagram illustrating channel flatness of an RF signal depending on whether a compensation capacitor bank is present or absent.
Figure 9B:
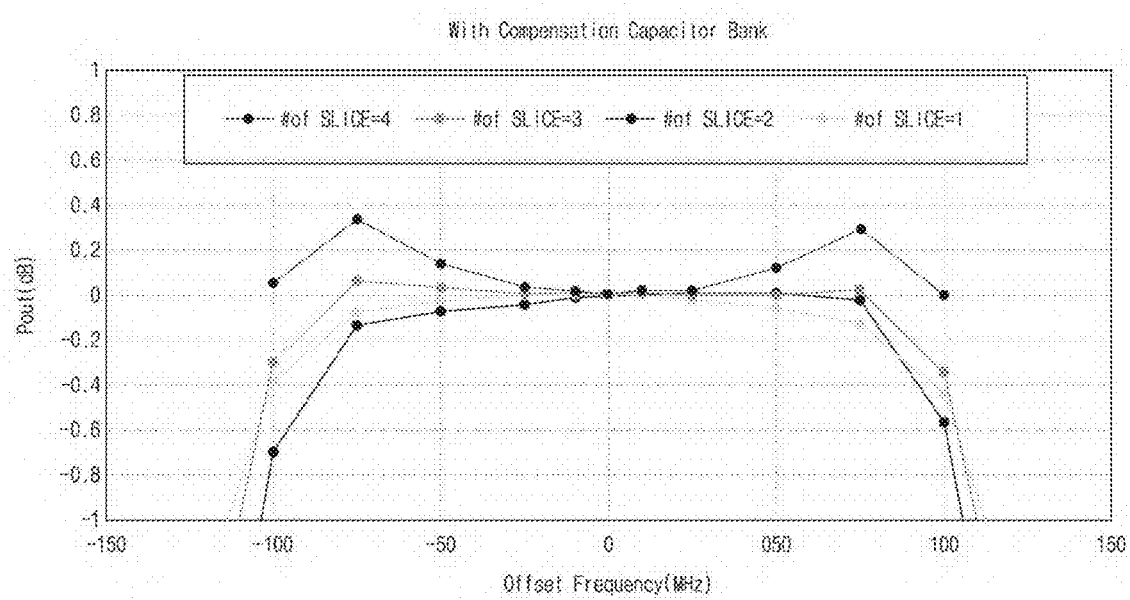

FIGS. 9A and 9B are diagram illustrating channel flatness of an RF signal depending on whether a compensation capacitor bank is present or absent. In FIGS. 9A and 9B, a slice refers to the number of turned-on unit amplifiers 121, among a plurality of unit amplifiers 121.

Referring to FIG. 9A, in the absence of the compensation capacitor bank 130, the radio-frequency signal RF may be turned such that an upper-side band and a lower-side band are symmetrical with respect to a frequency of a local oscillation signal (a point at which an offset frequency is zero) when unit amplifiers 121 are all in a turned-on state. However, as the number of slices is decreased, for example, the number of turned-off unit amplifiers 121 is increased, the input capacitance Cin_Amp of the amplification stage 120 may be decreased, and thus a tuning frequency may be gradually shifted to a high frequency (which may be referred to as high-shift). Eventually, this may result in poor channel flatness.

Meanwhile, in the presence of the compensation capacitor bank 130 as in the present disclosure, as can be seen from FIG. 9B, a tuning frequency is maintained because varying input capacitance may be compensated for even when the number of slices is decreased. As the tuning frequency is maintained, symmetricity (or substantial symmetry) between an upper-side band a lower-side band may be maintained, and thus channel flatness may also be maintained or improved.

The maintenance of the channel refers to a decrease in deviation of power Pout in a channel, which means that performance of an error vector magnitude (EVM) is improved. In addition, asymmetricity between the upper-side band and the lower-side band means that power is asymmetric depending on a resource block (RB). When the compensation capacitor bank 130 is absent, calibration should be additionally performed to address the power asymmetricity between RBs.

However, when the compensation capacitor bank 130 according to example embodiments is provided, the asymmetricity between RBs may be addressed. Therefore, calibration based on a frequency does not need to be additionally performed.

Figure 10:
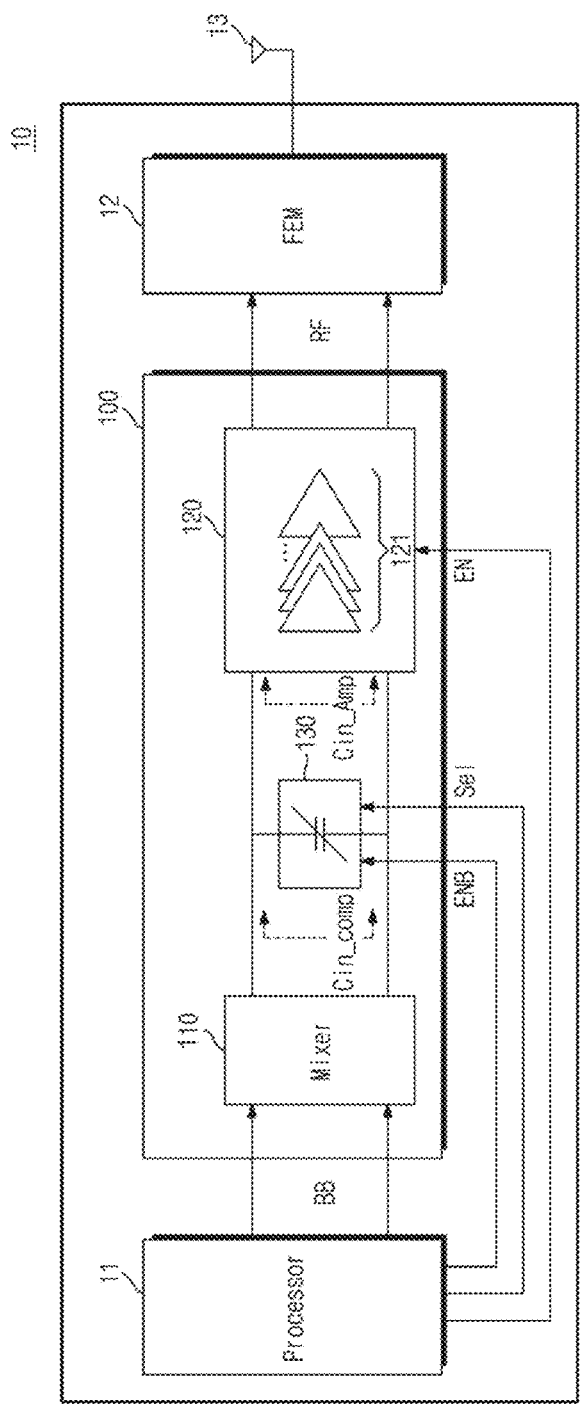
FIG. 10 is a diagram illustrating an electronic device according to some example embodiments.

FIG. 10 is a diagram illustrating an electronic device according to some example embodiments. Hereinafter, detailed descriptions of overlapping technical features will be omitted.

Referring to FIG. 10, an electronic device 10 according to some example embodiments may include a processor 11, an RF chip 100, a front-end module (FEM) 12, and an antenna 13.

The processor 11 may process a digital signal and then convert the digital signal into an analog signal. Alternatively, the processor 11 may convert an analog signal into a digital signal and then process the digital signal. A converted analog signal, or an analog signal to be converted, may be a baseband signal BB having a baseband. The processor 11 may transmit the baseband signal BB to the RF chip 100. The processor 11 may be, for example, a modem, an application processor (AP), or a modem & application processor (ModAP) in which a modem function is integrated into an AP.

The RF chip 100 may up-convert the baseband signal BB, received from the processor 11, to output a radio-frequency signal RF to the FEM 12. The RF chip 100 may be implemented according to some of the above-described example embodiments.

In some example embodiments, the RF chip 100 may include a mixer 110, an amplification stage 120, and a compensation capacitor bank 130. The mixer 110 may convert the baseband signal BB, transmitted from the processor 11, into an RF frequency band. A gain of the amplification stage 120 may be adjusted based on a first control signal EN. Each of a plurality of unit amplifiers 121, included in the amplification stage 120, may be turned on or turned off based on the first control signal EN, resulting in variation of input capacitance Cin_Amp of the amplification stage 120.

When the gain of the amplification stage 120 is adjusted based on the first control signal EN, capacitance of the compensation capacitor bank 130 may be adjusted based on a second control signal ENB, complementary to the first control signal EN, and/or a third control signal Sel for selecting a plurality of capacitors included in the compensation capacitor bank 130. In some example embodiments, the second control signal ENB and/or the third control signal Sel may be applied to the RF chip 100 through the processor 11.

Accordingly, the variation of the input capacitance Cin_Amp of the amplification stage 120 may be compensated for by the capacitance of the compensation capacitor bank 130. Then, input capacitance viewed from an output terminal of the mixer 110 may be maintained to be constant. As a result, a tuning frequency of the radio-frequency signal RF may be maintained in spite of an operation of the amplifying stage 120, and thus channel flatness may be prevented from or having reduced deteriorating.

The FEM 12 may be configured to amplify the radio-frequency signal RF output from the RF chip 100 or to guide an amplified radio-frequency signal RF to one or more signal paths. To this end, the FEM 12 may include one or more power amplifiers Pas and one or more switches. The FEM 12 may be connected to the RF chip 100 through various connection interfaces (for example, Mobile Industry Processor Interface (MIPI), or the like) and may operate under the control of the RF chip 100.

The antenna 13 may transmit the radio-frequency signal RF, received from the FEM 12, to another wireless communications device.

While the electronic device 10 according to some example embodiments has been described in terms of a transmit chain, the electronic device 10 may include a receive chain (Rx chain). In this case, the electronic device 10 may perform an operation to process the received radio-frequency signal RF.

As described above, according to example embodiments, an RF chip to improve channel flatness may be provided.

As described herein, any electronic devices and/or portions thereof according to any of the example embodiments may include, may be included in, and/or may be implemented by one or more instances of processing circuitry such as hardware including logic circuits; a hardware/software combination such as a processor executing software; or any combination thereof. For example, the processing circuitry more specifically may include, but is not limited to, a central processing unit (CPU), an arithmetic logic unit (ALU), a graphics processing unit (GPU), an application processor (AP), a digital signal processor (DSP), a microcomputer, a field programmable gate array (FPGA), and programmable logic unit, a microprocessor, application-specific integrated circuit (ASIC), a neural network processing unit (NPU), an Electronic Control Unit (ECU), an Image Signal Processor (ISP), and the like. In some example embodiments, the processing circuitry may include a non-transitory computer readable storage device (e.g., a memory), for example a DRAM device, storing a program of instructions, and a processor (e.g., CPU) configured to execute the program of instructions to implement the functionality and/or methods performed by some or all of any devices, systems, modules, units, controllers, circuits, architectures, and/or portions thereof according to any of the example embodiments, and/or any portions thereof.

While example embodiments have been shown and described above, it will be apparent to those skilled in the art that modifications and variations could be made without departing from the scope of the present inventive concepts as defined by the appended claims.

What is claimed is:
1. A radio-frequency (RF) chip comprising:
a mixer configured to mix a local oscillation signal with a baseband signal to output an RF signal;
an amplification stage configured to amplify the RF signal through a plurality of unit amplifiers operating in response to a first control signal; and
a compensation capacitor bank provided between the mixer and the amplification stage, the compensation capacitor bank being configured to adjust a capacitance of the compensation capacitor bank based on a second control signal, the second control signal being complementary to the first control signal.
2. The RF chip of claim 1, wherein
each of the plurality of unit amplifiers are configured to be turned off or turned on by the first control signal.
3. The RF chip of claim 2, wherein
based on a number of turned-off unit amplifiers increasing, among the plurality of unit amplifiers, the capacitance increases.
4. The RF chip of claim 1, wherein
the compensation capacitor bank comprises one or more sub-capacitor banks, each comprising a plurality of capacitor adjustment circuits.

5. The RF chip of claim 4, wherein
each of the plurality of capacitor adjustment circuits comprises:
- a switch configured to be turned on or turned off based on the second control signal; and
- one or more unit capacitors connected to the switch.

6. The RF chip of claim 4, wherein
a number of the plurality of capacitor adjustment circuits is same as the plurality of unit amplifiers, where n is a positive integer.

7. The RF chip of claim 6, wherein
based on m unit amplifiers being turned on, m being less than or equal to n, n-m capacitor adjustment circuits of the plurality of capacitor adjustment circuits are configured to be turned on based on the second control signal.

8. The RF chip of claim 4, further comprising:
a control circuit configured to control the compensation capacitor bank based on the second control signal and a third control signal for independently operating the one or more sub-capacitor banks.

9. The RF chip of claim 8, wherein
the one or more sub-capacitor banks are each configured to be turned on or turned off based on the third control signal, and
the plurality of capacitor adjustment circuits are each configured to be turned on or turned off based on the second control signal.

10. The RF chip of claim 1, wherein
the compensation capacitor bank is configured to adjust the capacitance to compensate for input impedance of the amplification stage, the input impedance varying based on the first control signal.

11. The RF chip of claim 1, wherein
based on a number of the plurality of unit amplifiers being n, each of the first control signal and the second control signal has a magnitude of n bits.

12. The RF chip of claim 1, further comprising:
a matching network between the mixer and the compensation capacitor bank.

13. An operating method comprising:
outputting a radio-frequency (RF) signal by mixing a baseband signal with a local oscillation signal;
amplifying the RF signal through a plurality of unit amplifiers operating in response to a first control signal; and
adjusting capacitance of a compensation capacitor bank, provided at an input terminal of the plurality of unit amplifiers, based on a second control signal, the second control signal complementary to the first control signal.

14. The operating method of claim 13, further comprising:
applying a third control signal to independently operate one or more sub-capacitor banks included in the compensation capacitor bank.

15. The operating method of claim 13, wherein
based on a number of the plurality of unit amplifiers being n, each of the first control signal and the second control signal has a magnitude of n bits.

16. An electronic device comprising:
- a processor;
- a radio-frequency (RF) chip configured to receive a baseband signal from the processor and to output an RF signal from the baseband signal;
- a front-end module (FEM) configured to amplify the RF signal; and
- an antenna configured to transmit the RF signal,
the RF chip comprising,
  - a mixer configured to mix a local oscillation signal with the baseband signal to output the RF signal;
    - an amplification stage configured to amplify the RF signal through a plurality of unit amplifiers operating in response to a first control signal; and
    - a compensation capacitor bank provided between the mixer and the amplification stage, the compensation capacitor bank configured to adjust a capacitance of the compensation capacitor bank based on a second control signal, the second control signal complementary to the first control signal.

17. The electronic device of claim 16, wherein
the compensation capacitor bank comprises one or more sub-capacitor banks, each comprising a plurality of capacitor adjustment circuits, and
the plurality of capacitor adjustment circuits are provided as many as the plurality of unit amplifiers.

18. The electronic device of claim 17, wherein
based on m unit amplifiers being turned on, m being less than or equal to n, n being a number of the plurality of unit amplifiers, n-m capacitor adjustment circuits of the plurality of capacitor adjustment circuits are configured to be turned on based on the second control signal.

19. The electronic device of claim 17, further comprising:
the RF chip further comprises a control circuit configured to control the compensation capacitor bank based on the second control signal and a third control signal for independently operating the one or more sub-capacitor banks.

20. The electronic device of claim 16, wherein
the compensation capacitor bank is configured to adjust the capacitance to compensate for input impedance of the amplification stage, the input impedance varying depending on the first control signal.

* * * * *